United States Patent [19]

Yamada et al.

[11] Patent Number: 5,076,776
[45] Date of Patent: Dec. 31, 1991

[54] ANNULAR DIE FOR A LAMINATION PRODUCT

[75] Inventors: Takao Yamada; Yoshiaki Higuchi, both of Nagahama, Japan

[73] Assignee: Mitsubishi Plastics Industries Limited, Tokyo, Japan

[21] Appl. No.: 568,055

[22] Filed: Aug. 16, 1990

[51] Int. Cl.$^5$ .............................................. B30B 11/22
[52] U.S. Cl. .................. 425/133.1; 425/462; 425/463; 425/467; 156/500
[58] Field of Search ...................... 156/244.11, 244.13, 156/244.14, 500; 425/131.1, 133.1, 133.5

[56] References Cited

U.S. PATENT DOCUMENTS

| | | |
|---|---|---|
| 3,308,508 | 3/1967 | Schrenk . |
| 3,337,914 | 8/1967 | Corbett . |
| 3,809,515 | 5/1974 | Farrell ................................. 425/133 |
| 4,167,383 | 9/1979 | Murakami et al. ................ 324/133.1 |
| 4,182,603 | 1/1980 | Knittel ............................. 425/133.1 |
| 4,185,954 | 1/1980 | Murakami et al. ................ 425/133.1 |
| 4,285,656 | 8/1981 | Herrington ......................... 425/467 |
| 4,298,325 | 11/1981 | Cole ................................. 425/133.1 |
| 4,798,526 | 1/1989 | Briggs et al. ..................... 425/133.1 |

FOREIGN PATENT DOCUMENTS 0252388 1/1988 European Pat. Off. .
0063371 12/1988 Japan .
0004898 1/1989 Japan .

OTHER PUBLICATIONS

Patent Abstracts of Japan, vol. 5, No. 72 (M-68)[744], 14th May, 1981; & JP-A-56 24 133 (Asahi Dow K.K.) 07-08-1979.

Primary Examiner—Caleb Weston
Attorney, Agent, or Firm—Oblon, Spivak, McClelland, Maier & Neustadt

[57] ABSTRACT

An annular die for a lamination product comprises a center core portion 2, four circular-plate-like rings 1 arranged around the center core portion in the vertical direction so as to form a resin passage, which is communicated with a die lip 7, at the inner surface of the circular-plate-like rings, wherein openings for feeding resin are formed so as to open at the outer circumferential portions of mating surfaces 11 of the circular-plate-like rings; manifolds 5 are formed in either one of the mating surfaces of the rings so as to extend from the opening 4 in a spiral form, the depth of the manifolds being gradually decreased toward the inside of the mating surfaces; and a final resin-flowing area 51 is formed to communicate the manifolds 5 with the resin passage.

2 Claims, 5 Drawing Sheets

ANNULAR DIE FOR A LAMINATION PRODUCT

The present invention relates to an annular die for producing a multi-layered lamination product such as lay-flat films, blown bottles or the like which are composed of a plurality of resin layers.

In a multi-layered lamination product prepared by laminating various types of resin, kinds of resin and the number of layers are determined depending on the purpose of use, the quality required and so on. With diversification of the quality and advancement in requirements in a field of food packaging, multi-layered composite materials have been produced by increasing the number of layers of various kinds of resin taking advantages of their own characteristics.

Description will be made as to a multi-layered lay-flat film as an example of a multi-layered lamination product in a field of food packaging material. Usually, as an annular die for producing a multi-layered lay-flat film, an annular die of a cylindrical type wherein a spiral groove is formed, as shown in FIG. 5, has been used.

The annular die of a cylindrical type with a spiral groove comprises a core mandrel 10 at its central portion and a plurality of annular die rings 11 arranged around the core mandrel 10 in a concentric manner. A resin passage 12 in a form of spiral groove is formed at the outer circumference of each of the core mandrel 10 and the die rings 11. Resins introduced in the annular die flow in the separate resin passages 12 and join at a joining portion of the resin passages, and is discharged outside through a die lip 13.

In the conventional annular die, however, gaps formed at the fitting portions between the core mandrel 10 and the die rings 11 constituted dead spaces, whereby the resins stagnated at the portions. This caused problems of deterioration of the resins and formation of burnt residues.

In a case that a lamination product is formed by using resins whose melting points and heat-resistant properties are remarkably different, it is necessary to adjust the temperature of the annular die at or near planes where the resins flow, to a temperature suitable for the resin used. However, it was difficult to adjust the temperature of the inner part of the die rings because temperature adjustment is conducted by a heating means such as heaters provided at the outer circumferential portion of the annular die.

Further, since the above-mentioned spiral groove is formed in the cylindrical core mandrel and the die rings, it is unavoidable that the height in the axial direction of the annular die is high. Accordingly, the upper end portion of the stacked die rings was apt to incline due to thermal expansion, with the result that the thickness of an extruded resin film was fluctuated. In particular, in a case that the number of die rings was large, i.e. the number of resin layers was to be increased, adjustment of film thickness was troublesome. It was considered to be difficult to prepare an annular die for producing a lamination consisting of four layers or more.

It is an object of the present invention to provide an annular die for a lamination product which is capable of producing easily a multi-layered lay-flat film consisting of more than four resin layers.

In accordance with the present invention, there is provided an annular die for a lamination product which comprises a center core portion, at least two circular-plate-like ring bodies arranged around the center core portion in the vertical direction so as to form a resin passage which is communicated with a die lip, at the inner surface of the circular-plate-like ring bodies, wherein an opening for feeding resin is formed so as to open at the outer circumferential portion of mating surfaces of the circular-plate-like ring bodies; a manifold is formed in either one of the mating surfaces of the ring bodies so as to extend from the opening in a spiral form, the depth of the manifold being gradually decreased toward the mating surfaces; and a final resin-flowing area is formed to communicate the manifold with the resin passage.

Preferred embodiments of the annular die for a lamination product of the present invention will be described.

Figure 1:
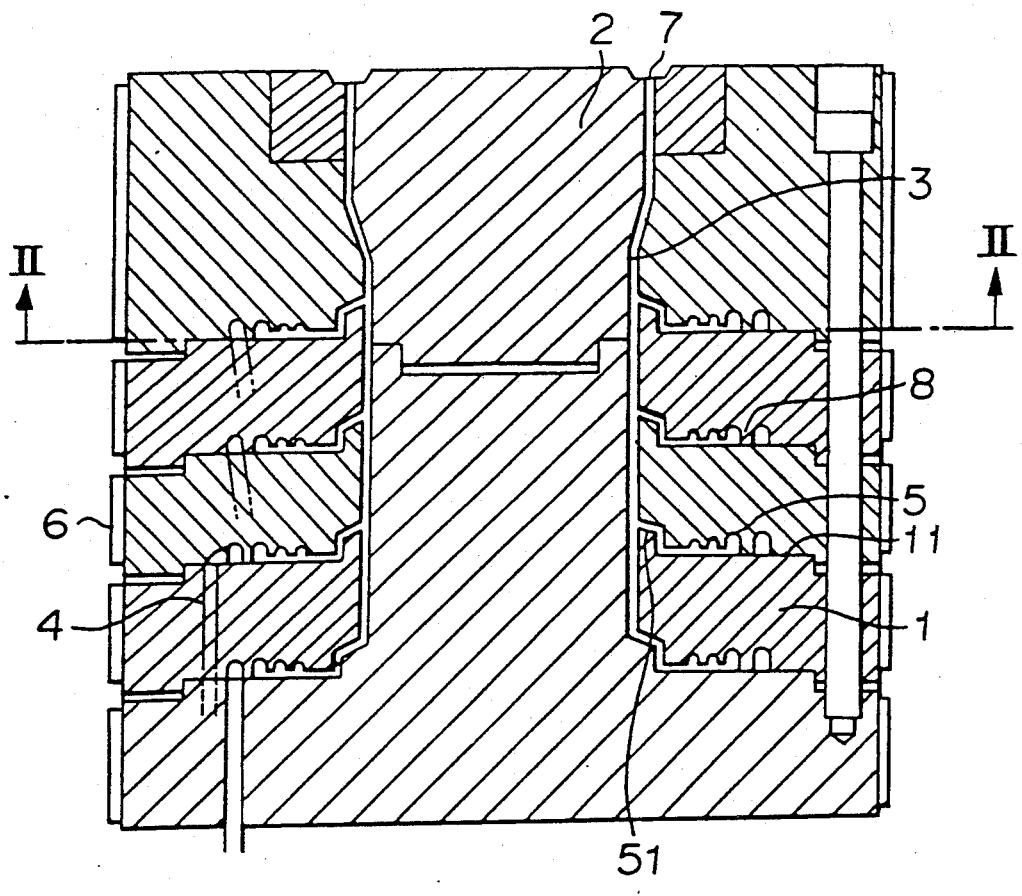
FIG. 1 is a longitudinal cross-sectional view of an embodiment of the annular die for a lamination product according to the present invention.
Figure 2:
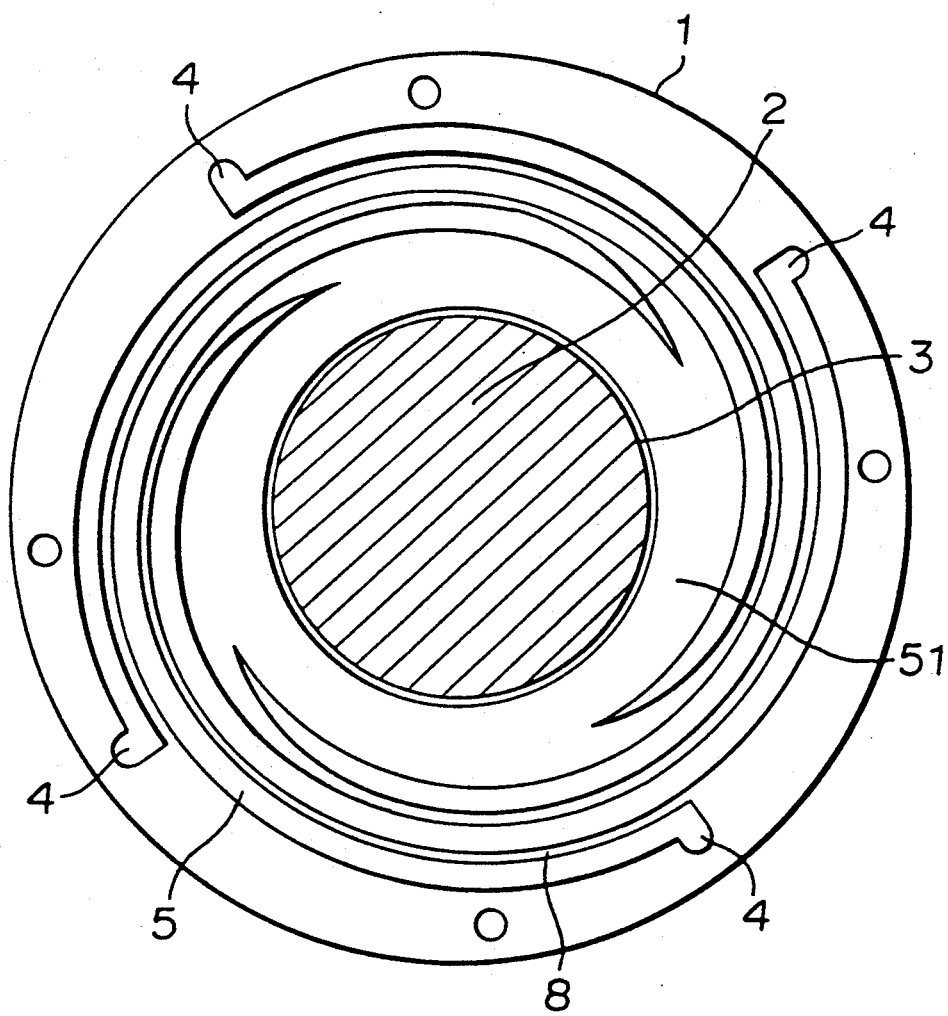
FIG. 2 is a plane view taken along a line II—II in FIG. 1.

In FIGS. 1 and 2, a reference numeral 1 designates a circular-plate-like ring. In this embodiment, two or more circular-plate-like rings are arranged in the vertical direction to thereby form mating surfaces 11 between adjacent rings. Also, a resin passage 3 which is communicated with a die lip 7 is formed in a gap between the inner surfaces of the rings 1 and the outer circumferential surface of a center core portion 2.

For such center core portion 2, a mandrel having an outer surface to which no groove is formed, as shown in FIG. 1, is used. However, such a mandrel having a spiral groove at its outer circumference as of a conventional type may be used.

An opening 4 for supplying resin is formed at the outer circumferential portion of each of the circular-plate-like rings so as to open to the mating surfaces. The number of the opening 4 may be single. It is preferable that the number is in a range of from 2 to 8 in which the openings are evenly distributed so as to provide uniform movement of resin in the circumferential direction. FIG. 2 shows an example in which four openings 4 are formed. The positions of the openings at each of the mating surfaces can be determined as desired. However, it is preferable that the positions of the openings are shifted between adjacent circular-plate-like rings so that the film thickness of the resins can be precisely controlled and an arrangement of pipes connecting between the openings and an extruder can be easy.

Figure 6:
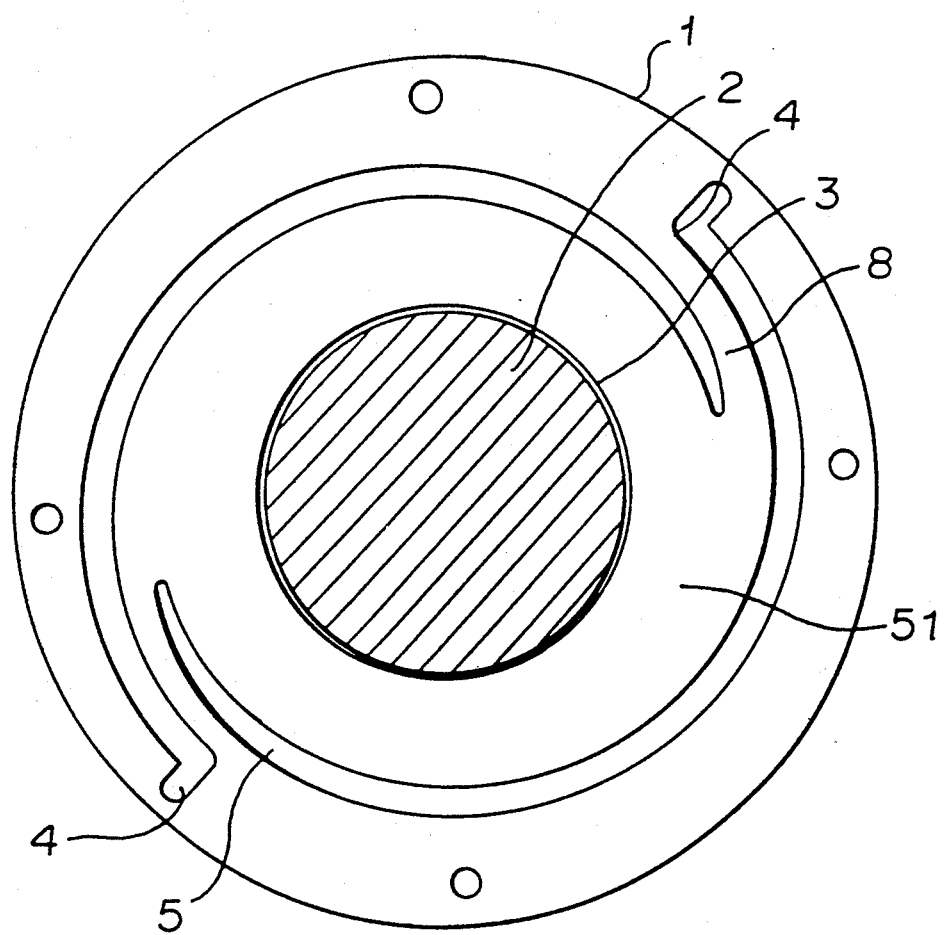
FIG. 6 is a plane view, similar to FIG. 2, which shows another embodiment of the annular die of the present invention.

Manifolds 5 are formed in a plane portion of each of the circular-plate-like rings, which provides mating surfaces in cooperation with the adjacent circular-plate-like ring, in a spiral form so that each of the manifolds 5 extends between each of the openings 4 and the resin passage 3. Various shapes may be utilized for the manifolds 5. However, it is preferable that Archimedes' spiral is used from the viewpoint of easiness of machining operations and uniformity in the thickness of the film extruded. Preferably, two or more manifolds 5 are formed and they are overlapped at least their thin end sides as to eliminate production of weld marks, as shown in FIGS. 6. More preferably, two or more manifolds 5 are entirely overlapped in the radial direction on the same plane of a circular-plate-like ring, i.e. there are at least two manifolds in the radial direction of the ring as shown in FIG. 2, whereby molten resin is homogenized. By arranging the manifolds, weld marks which may result in a film product extruded from the die can be eliminated and molten resin can sufficiently be homogenized. The depth of the manifolds is gradually decreased toward the inside of the mating surfaces.

In the embodiment as shown in FIGS. 1 and 2, a gap formed between the top surface of a dam 8, which is formed between adjacent manifolds of a circular-plate-like ring 1 and a plane surface of another circular-plate-like ring 1, which cooperate to form matching surfaces, is gradually increased toward the inside of the rings. In this case, also the depth of the manifolds is gradually decreased toward the inside the mating surface. Accordingly, although most part of resin flows in the manifolds 5 at the portion near the openings 4, an amount of the resin flowing in the manifolds decreases as the resin flows along the manifolds 5 toward the inside of the mating surfaces, and on the contrary, an amount of the resin leaking toward the inside by overflowing the dam 8 increases. In the final resin-flowing area 51, the almost resin flows in the radial direction so as to form a uniform molten resin layer. Then, the flowing direction of the resin is changed to the axial direction of the die so that the manifolds 5 are communicated with the resin passage 3. An angle of the final resin-flowing area 51 to the resin passage 3 is desirably an acute angle. Specifically an angle of the flowing direction of the resin to the resin passage 3 is preferably in a range of from 15° to 45° in consideration of the strength of rings and so on.

The annular die as shown in FIG. 1 employs four circular-plate-like rings 1 to thereby form a lamination product consisting of four films. The number of laminated films can be easily increased or decreased by increasing or decreasing the number of circular-plate-like rings put in the annular die. Since each of the circular-plate-like rings can be separated vertically, heaters 6 can be attached to the outer circumference of it separately. Accordingly, adjustment of temperature can be easy when a resin having poor heat resistant properties is used for a lamination product. Further, since the annular die of the present invention is of such construction that the circular-plate-like rings are arranged in the vertical direction, no dead space is formed, the height in the axial direction is low, influence by thermal expansion is little, and adjustment in the thickness of the extruded die can be easily done.

Figure 3:
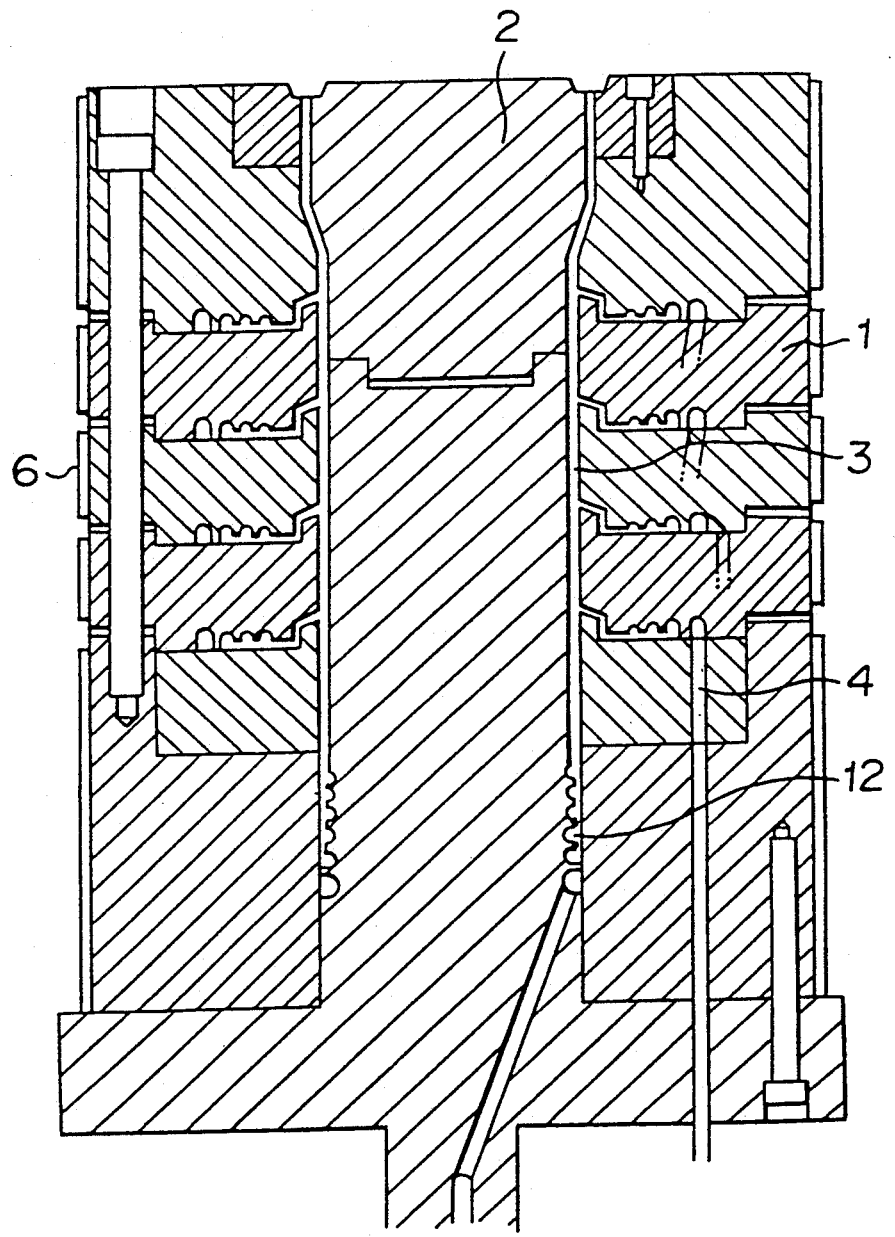
Figure 5:
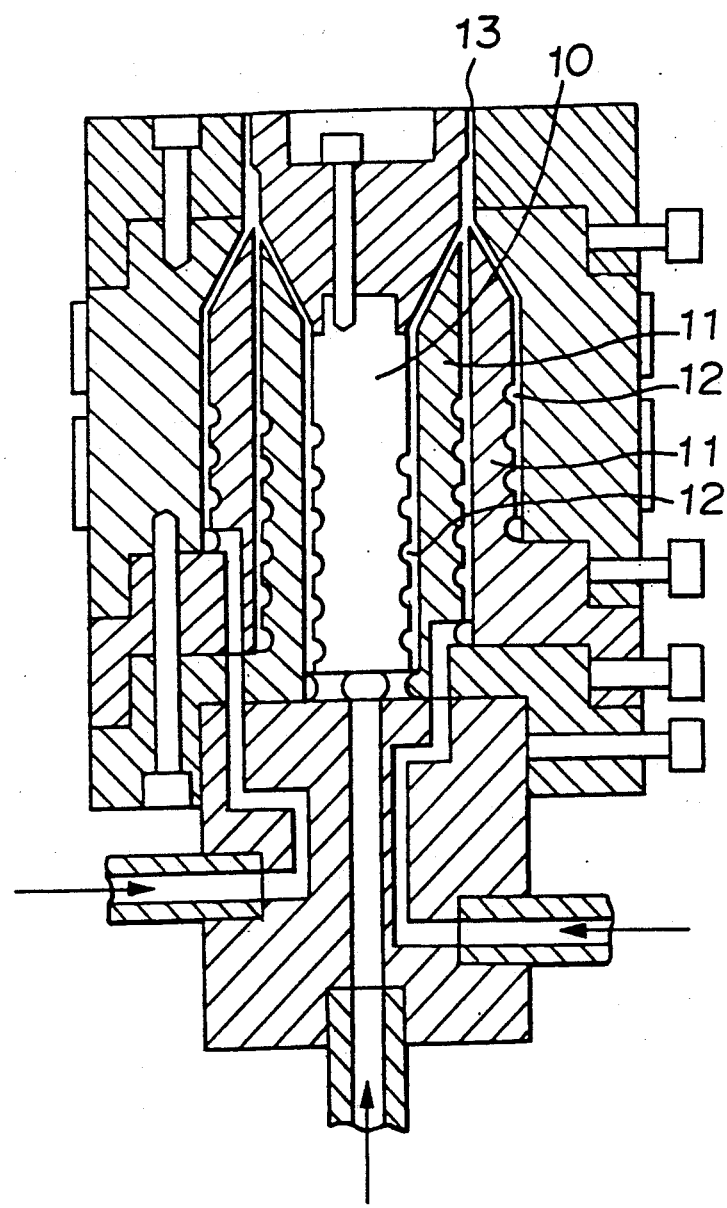
FIG. 5 is a longitudinal cross-sectional view of a conventional annular die.

FIG. 3 shows another embodiment of the annular die according to the present invention. In this embodiment, a resin passage 12 of a spiral groove is formed in the circumferential surface of the center core portion 2. In this embodiment, the number of resin layers can further be increased even when the height of the die is the same as that as shown in FIG. 1.

Figure 4:
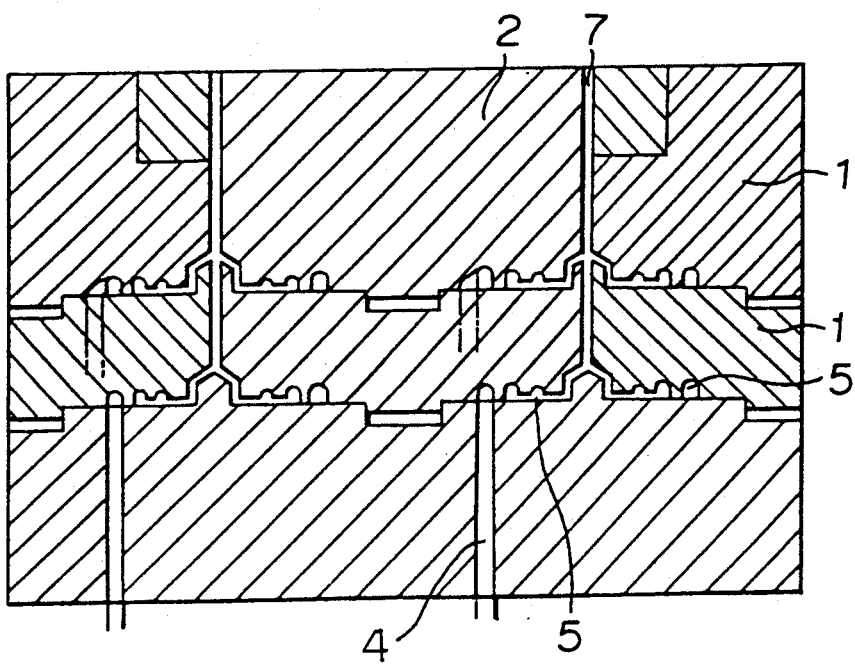
FIGS. 3 and 4 are respectively longitudinal sectional views of other embodiments of the annular die according to the present invention.

FIG. 4 shows another embodiment of the annular die of the present invention. In this embodiment, the center core portion 2 comprises a plurality of pieces between which mating surfaces are formed and spiral manifolds 5 are formed in the mating surfaces in the same manner as the circular-plate-like rings 1. The manifolds 5 are connected to the openings 4. A lamination product having four lamination films can be obtained in this embodiment. This embodiment further reduces the height of an annular die to thereby reduce the size of it.

Thus, in accordance with the present invention, a lamination product having an accurate thickness can be obtained. In particular, a multi-layered lay-flat film having more than four layers which was difficult to manufacture in the conventional annular die, can be easily obtained, and in particular, such lamination product is useful in a field of food packaging.

As the resin usable for the annular die of the present invention, there are polyolefin such as polyethylene, polypropylene, polyamide such as nylon, ethylene-vinylalcohol copolymer, polyvinyl chloride, polyvinylidene chloride and so on.

We claim:

1. An annular die for a lamination product which comprises:

a center core portion 2, at least two circular-plate-like ring bodies 1 arranged around the center core portion in the vertical direction so as to form a resin passage, which is communicated with a die lip 7, at the inner surface of the circular-plate-like ring bodies, wherein an opening 4 for feeding resin is formed so as to open at the outer circumferential portion of mating surfaces 11 of the circular-plate-like ring bodies;

a manifold 5 is formed in either one of the mating surfaces of the ring bodies so as to extend from the opening 4 in a spiral form, the depth of the manifold 5 being gradually decreased toward the inside of the mating surfaces; and a final resin-flowing area 51 is formed to communicate the manifold 5 with the resin passage.

2. The annular die for a lamination product according to claim 1, wherein a plurality of openings 4 are formed and a plurality of manifolds 5 ar spirally extended from the openings so that there are at least two different manifolds in the radial direction of a circular-plate-like ring body interposing a dam between the adjacent manifolds, and a gap formed between the top surface of a dam 8 for the spiral manifolds 5 formed in one of the mating surfaces and a plane surface of the other mating surface is gradually increased toward the inside of the mating surfaces.

* * * * *